United States Patent [19]

Fox

[11] Patent Number: 4,712,749

[45] Date of Patent: Dec. 15, 1987

[54] MEANS FOR AND METHODS OF CONTROLLING ORNITHOPTERS

[76] Inventor: Duke Fox, 5305 Towson Ave., Ft. Smith, Ark. 72901

[21] Appl. No.: 786,624

[22] Filed: Oct. 11, 1985

[51] Int. Cl.⁴ .............................................. B64C 33/02
[52] U.S. Cl. ........................................ 244/22; 244/72
[58] Field of Search ......................... 244/11, 22, 28, 72

[56] References Cited

U.S. PATENT DOCUMENTS

| 706,198 | 8/1902 | Phares . | |
|---|---|---|---|
| 1,308,784 | 7/1919 | Hoiland | 244/22 |
| 1,704,112 | 3/1929 | Stelzer . | |
| 1,743,516 | 1/1930 | Andrews . | |
| 1,752,100 | 3/1930 | Meindersma . | |
| 2,017,534 | 10/1935 | Gray . | |
| 2,155,468 | 7/1939 | Budig . | |
| 2,407,777 | 9/1946 | Gralunder . | |
| 2,578,845 | 12/1951 | Schmidt . | |

FOREIGN PATENT DOCUMENTS 1025275  2/1958  Fed. Rep. of Germany ........ 244/72

Primary Examiner—Galen Barefoot
Attorney, Agent, or Firm—Laff, Whitesel, Conte & Saret

[57] ABSTRACT

An ornithopter aircraft has at least a fuselage and four rigid wings which are tandem mounted, in pairs, on opposite sides of the fuselage, in what might be called a "dragonfly configuration". The forward wing in a first of the tandem pairs on one side of the fuselage beats upwardly simultaneously with the diagonally opposed rear wing in the tandem pair on the opposite side of the fuselage, while the remaining two wings are beating downwardly. Then, the wings reverse their direction of travel. The previously upwardly moving wings beat downwardly while the previously downwardly moving wings beat upwardly. The pitch of the wings are varied throughout the beat to produce lift on the downstroke and minimum air resistance on the upstroke, considering the forward speed of the aircraft or the lack thereof. The pitch of the wings are set at the sink angle of a glider wing flying at the same speed. A differential between the picth or stroke of the wings on opposite sides of the fuselage controls direction and banking of the ornithopter.

18 Claims, 9 Drawing Figures

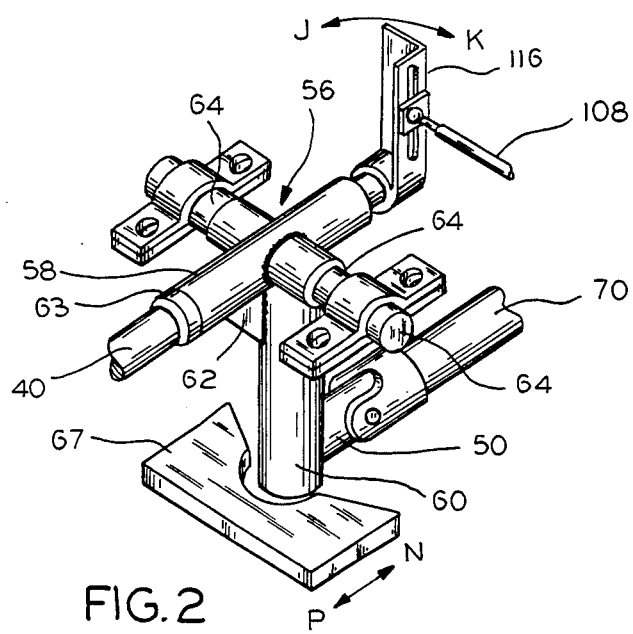
FIG. 2
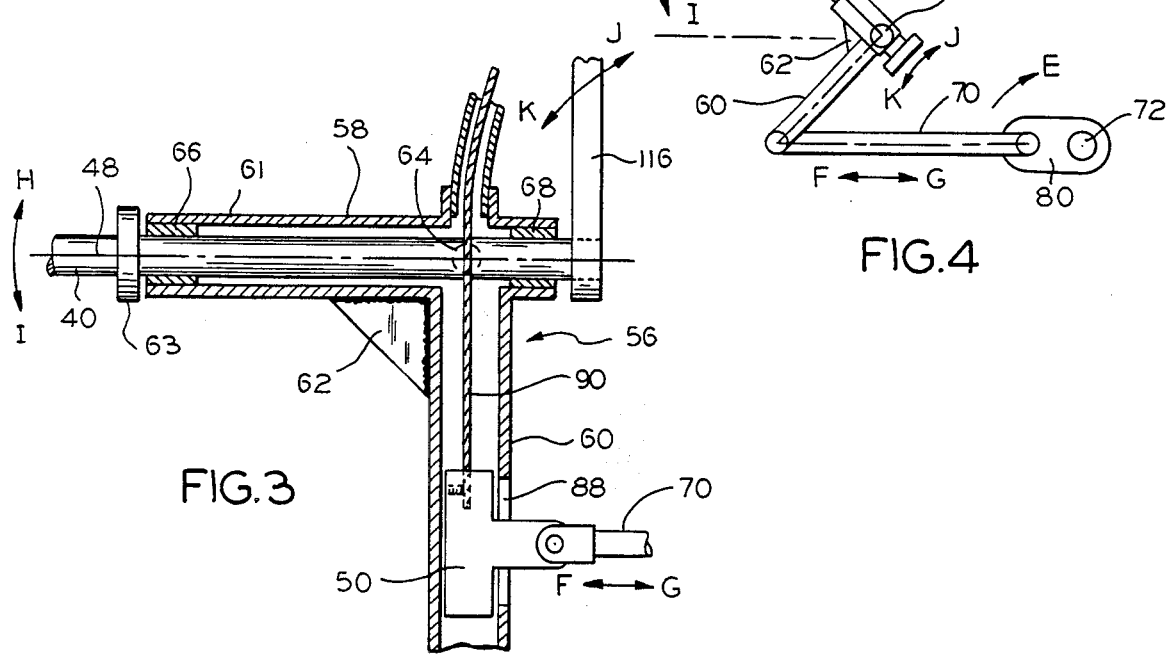
FIG. 3
FIG. 4
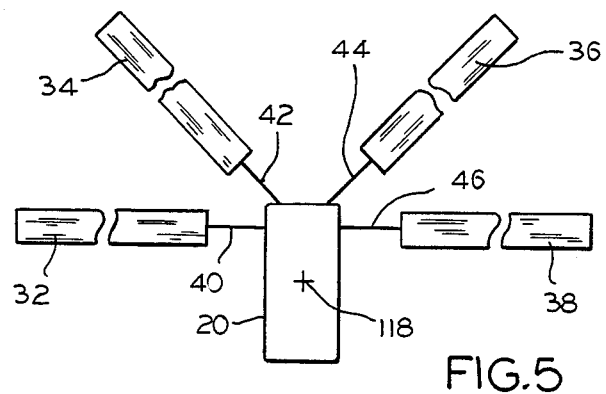
FIG. 5

CYCLE ACTION REQUIRED
IN HOVER SITUATION

CYCLE ACTION REQUIRED
FOR SLOW FORWARD FLIGHT

CYCLE ACTION REQUIRED
FOR HIGH SPEED FLIGHT

MEANS FOR AND METHODS OF CONTROLLING ORNITHOPTERS

This invention relates to ornithopters and, more particularly, to means for and methods of controlling ornithopers.

Man has always wanted to fly in the manner of a bird. To a considerable degree, the development of the airplane has fulfilled this desire; however, in matters of hovering, vertical take-offs and landings, and the like, airplanes do not answer the need. Therefore, further developments have produced the helicopter, but it also has its shortcomings since it is expensive, has high maintenance costs, has limited speed and range, is not fuel efficient, and is very vulnerable in power out situations.

Before the Wright Brothers, many airplanes were built that were capable of flying, but they crashed because they lacked controls. Thus, at that time, it was widely believed that the flight of an airplane was impossible when the truth was that no one had yet discovered how to control them. This and other similar problems have centered around previous designs for ornithopters.

Heretofore, attempts to make ornithopters have resulted in awkward machines which merely thrashed around, flapping their wings, with no significant lift and little or no direction of flight. Hence, ornithopters have never been seriously considered as a machine for carrying mankind, primarily because there did not appear to be any practical way to control them. More particularly, these previous attempts to make ornithopters have used some kind of a flexible wing structure, which has a deficiency of mechanical strength and which leads to an inability to control the flight. As a result, most people ridicule the ornithopther, when the simple truth is that heretofore nobody had discovered how to control them.

A number of these previous attempts at machines designed for ornithopter flight are shown in the following U.S. Pat. Nos. 2,578,845; 2,407,777; 2,155,468; 2,017,534; 1,752,100; 1,743,516; 1,704,112; and 706,198. Of these, it is thought that, perhaps, U.S. Pat. No. 2,017,534 (Gray) is the best; however, it has no controls. Another of these patents worthy of special note is U.S. Pat. No. 1,704,112 (Stelzer) which uses adjustable tension springs to control the flexing of the wings so that the wing pitch varies from the root to the tip of the wing during each beat. Stelzer also has a simplistic engine-wing relationship which is not thought to be practical.

Accordingly, an object of the invention is to provide new and improved controls for ornithopters. Another object is to provide methods of controlling ornithopter flight, both powered and during power outages. Here, an object is to provide ornithopters which may both hover and fly at any speed between an extremely slow speed mode and a relatively high speed mode.

Another object of the invention is to provide a flight control mechanism whereby an ornithopter can be hovered, turned, banked, and maneuvered, especially while in close quarters.

In keeping with an aspect of the invention, these and other objects are provided by an aircraft having a fuselage and tail assembly comprising a rudder and stabilizers of more or less conventional design. Two pairs of rigid wings are tandem mounted on opposite sides of the fuselage in what might be called a "dragonfly configuration." On one side of the fuselage, the forward wing beats upwardly simultaneously with the rear wing on the opposing side of the fuselage. At that time, the remaining two wings are beating downwardly. Then, the roles reverse and the wings which previously moved upwardly, begin to move downwardly, while the previously downwardly moving wings move upwardly. The pitch of the airfoils or cross sections of the wings are rotated or varied throughout the beat to produce lift on the downstroke and minimum air resistance on the upstroke. A differential between the pitch or stroke of the wings on opposite sides of the fuselage controls the direction and banking of the ornithopter. A similar differential between the front and back wings controls the climbing and diving of the ornithopter.

It might be helpful to think of the inventive ornithopter as a glider in which the wings are set to cause the aircraft to glide forwardly and downwardly. To keep the fuselage from sinking, wings are moved downwardly at the required rate. When one wing runs out of downward travel, it is lifted to a raised position from which it starts over again to glide. While the wing is lifted during the upstroke, it is rotated about its longitudinal axis so that the airfoil is at the minimum drag angle.

A preferred embodiment of the invention is shown in the attached drawings, in which:

FIG. 2 is a perspective view of an examplary right-front hinge joint or fitting for enabling a change in both the wing pitch and a flapping of the wing;

FIG. 3 is a cross sectional view of the hinge joint of FIG. 2;

FIG. 4 is a schematic side elevation showing a mechanism for producing the flapping motion of a wing beat;

FIG. 5 is a schematic front elevation view which identifies the wings and show how they move in synchronism to beat up and down;

Figure 7:
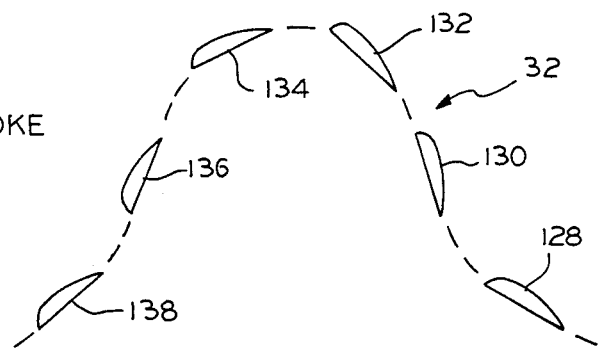
Figure 8:
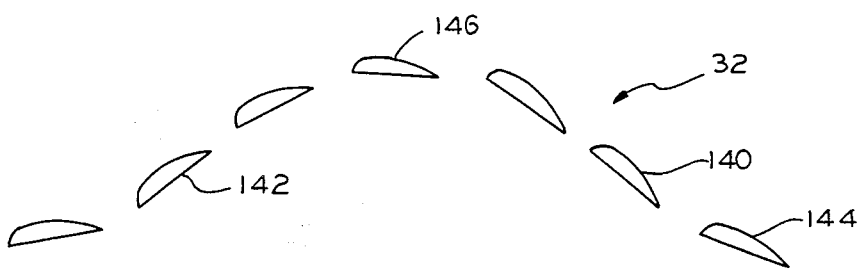

FIG. 7 is an end view of the same wing tip airfoil or cross section, shown in many successive positions, to illustrate how the pitch of the wing varies during a beating cycle while the ornithopther is flying in a slow forward mode of operation; and FIG. 8 is an end view of the same wing tip in many successive positions which show how the pitch varies throughout a beating cycle during a high speed mode of operation.

Figure 1:
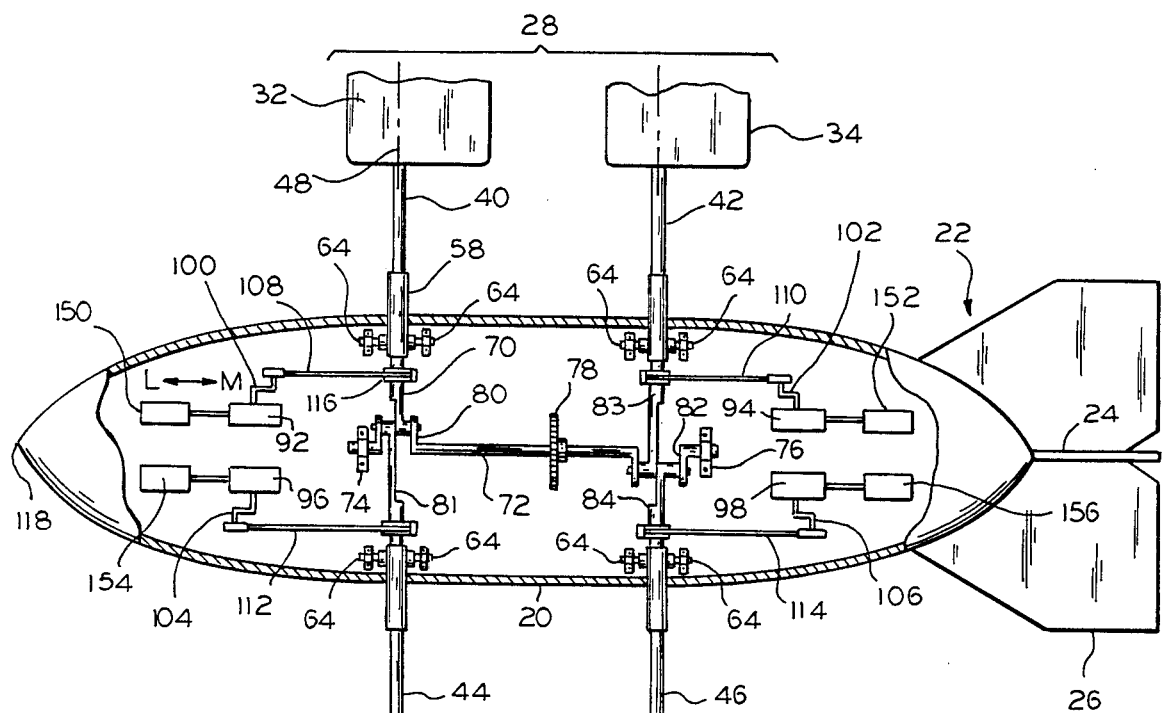
FIG. 1 is a schematic plan view of the inventive ornithopter showing the wing pitch change control drive train.
Figure 1A:
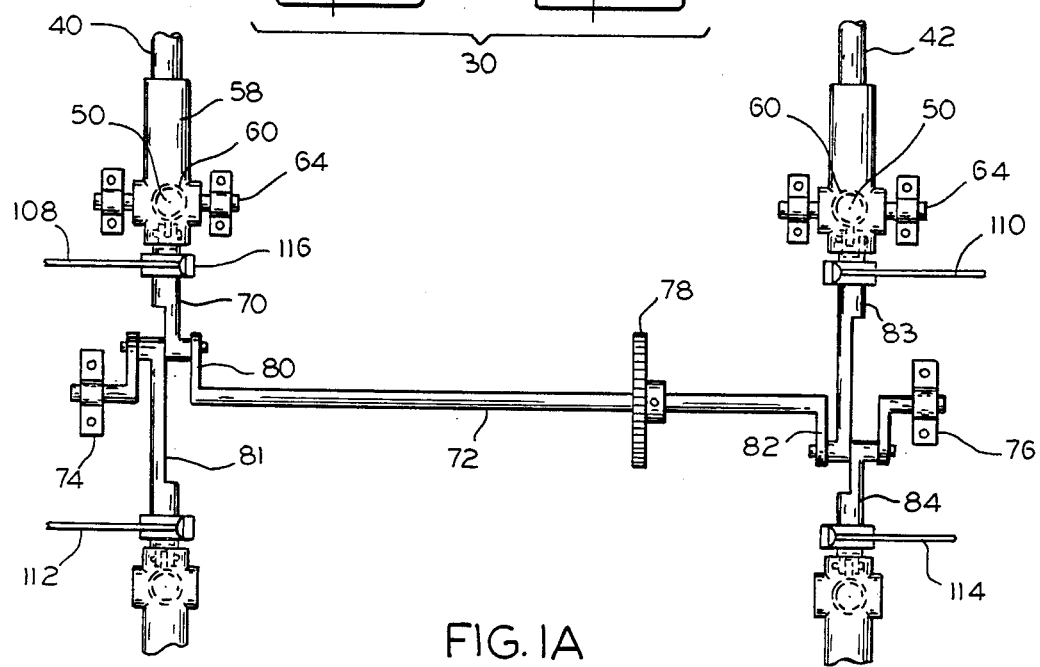
FIG. 1A is a continuation of FIG. 1, showing the wing flapping drive train.

FIGS. 1 and 1A are two similar schematic plan views showing the drive trains of the inventive ornithopter. One or more engines (not shown) are suitably mounted, such as inside the fuselage 20, for giving a powered flight. A conventional tail assembly 22, having conventional controls, includes a rudder 24 and stabilizers 26. The primary function of this conventional tail assembly 22 is to provide directional and attitude control while the ornithopter is in a gliding (power out) mode. However, the tail also provides additional stability and control for the ornithopter while it is flying in the powered or flapping mode.

There are two opposing pairs 28, 30 of tandem wings 32, 34 and 36, 38, which are mounted on opposite sides of the fuselage in a dragonfly configuration. Each of these wings is a rigid structure having a construction using a blend of airplane wing and helicopter rotor technology. Of course, any wing tends to flex somewhat during flight; however, that limited amount of flexing is minimal and does not make the wing flexible in the sense that a bird's wing is flexible or that a wing designed to warp and twist during flight is flexible. The wings 32-38 are unitarily mounted on individually associated shafts or spars 40-46 so that each wing and spar may rotate and turn as a unit about a common longitudinal axis to provide a pitch change motion which varies cyclically over each flap cycle.

The wing flapping motion is accomplished when power from the engine or engines is applied through a reduction gearbox to drive a crankshaft (FIG. 1A) mounted along the center line of the fuselage and below the wing hinge point by a distance which is equal to the midpoint setting of a sliding bearing block 50 (FIG. 3). The power from the crankshaft is transmitted to the wings by connecting rods shown in FIGS. 1A, 4.

Thus, from an inspection of FIGS. 2, 3, it should be apparent that two distinctive motions are involved, one motion being about the hinge pins or trunnions 64, 64 and the other motion being about the bearings 66, 68. As will become more apparent, two separate but coordinated drive trains (FIGS. 1 and 1A) are used to provide these two motions. The drive train of FIG. 1 cyclically rotate the wings about their longitudinal axis. The drive train of FIG. 1A cyclically cause the arms to flap up and down. These two drive trains are geared or otherwise joined together so that each follows a cycle specifically related to the other. In a power out situation, the gearing between the two drive trains brings the wings to a mid-stroke gliding position where mechanical locks hold them in a fixed gliding position.

The mechanism for producing these wing motions is shown in FIGS. 1-4. Engines mounted inside the fuselage turn a number of crank arms and a crankshaft so that each of the four wings is flapping and rotating, as taught by FIGS. 5-8. More particularly, the principal component for giving this mechanical motion is a movable knee joint hinge fitting shown in FIGS. 2, 3. As shown in FIG. 2, there is a knee joint fitting 56, which may be in the form of two hollow, cylindrical arms 58, 60 having a gusset 62 therebetween, for giving added strength. This fitting may be cast, forged, or machined.

A pair of trunions 64, 64 project in opposite directions from the apex of the V-shaped knee joint to form hinge pins on which the wings pivot up and down during the flapping motion. The fitting is mounted on the frame of the aircraft by placing trunnions 64, 64 in pillow blocks secured to the airframe. Thus, as crankshaft 72 (FIGS. 1A, 4) and crank arm throw 80 rotate in direction E, connecting rod 70 reciprocally moves back and forth in directions F, G, to cause the knee joint arms to pivot on hinge pin 64 and to flap the wing 32 up and down in directions H and I.

The wing 32 (for example) is rigidly mounted on the main wing spar 40 (FIG. 3) so that they rotate as a unit. The spar 40 is co-axially mounted in a tubular or cylindrical arm 61 of the knee joint hinge fitting seen in cross section in FIG. 3 and in perspective in FIG. 2. The spar 40 has a collar 63 affixed thereto in order to longitudinally position it within the cylindrical or tubular housing formed by arm 61. Spar 40 is freely rotatable on bearings 66, 68, to set at any rotary angle, and thus, to change the pitch of the wings. Looking at it another way, the adjustment of the pitch of a wing by rotating the main wing spar 40 around the center line axis of rotation 48 is functionally about the same as changing the pitch on a conventional airplane propeller.

An arm 116 is affixed to rotate unitarily with spar 40. Therefore, when arm 116 swings in directions K-J, the spar 40 rotates in the same directions. Accordingly, pitch control arm 116 is connected to rotate the main wing spar 40 in order to control the amount of rotation that is experienced by the wing during each beat of the wings. Thus, the cyclic change of wing pitch is accomplished primarily by cyclically controlling the position of pitch control arm 116. A ratio of about 1:3 pivotal motion is required for the movement of arm 116 in order to vary between hover and fast forward; or, stated another way, the wing pitch change varies in a range from approximately 110° to approximately 30°. The pitch control arm 116 may be driven through a cycle by which the wing pitch is made larger on the downstroke than on the upstroke, or vise versa. This differential pitch is exemplified by FIG. 6 where the wing pitch is different on the upstroke than it is on the downstroke.

Arm 116 may be a hydraulic ram, or the like, which lengthens or shortens responsive to pilot or servo transmitted commands. Also, an eccentric or a cylindrical cam (such as a slow spiral) may be built into or associated with pitch control arm 116 to cause the arm to lengthen or shorten as a function of the rotation of the cam.

While lengthening or shortening arm 116 will vary the total pitch angle change, a repositioning of the pitch angle arc is required to shift from hover to slow flight to fast flight. This is accomplished by sliding the gearboxes 92, 94, 96, and 98 either closer or further from the main wing hinge. For this movement, a servo system 150-156 is individually associated with each of the gearboxes 92-98.

The fitting of FIGS. 2, 3 have indexing cams or pins which immobilize the wings in a mid-stroke position with a fixed airfoil pitch so that the airfoil or cross section is in a proper glide angle. More particularly, a sliding block 67 (FIG. 2) may be moved in front of arm 60 to be in compression when air resistance to gliding tends to force the wing upwardly. In compression, this block 67 immobilizes the wings during power out conditions.

For example, block 67 (FIG. 5) may move back and forth in directions N, P. While power is being applied to the aircraft, parts (not shown) engage and move block 67 in direction P and hold it in a retracted and non-operating position where it has no effect upon the movement of the hinge fitting. If there is a power outage, those parts are released and they immediately and automatically move block 67 in direction N to lock arm 60 in a fixed position. The resulting locking of arm 60 immobilizes the wings in a fixed position having the proper alignment. The pitch of the wings is geared to move synchronously with the flapping mechanism so it will automatically assume a zero pitch position and enable the aircraft to glide to a safe landing.

In operation, an engine (not shown) drives through a reduction gearbox (also not shown) to turn a main crankshaft 72 (FIG. 1A) by means of a gear or sprocket wheel 78 affixed thereto. The opposite ends of crankshaft 72 are mounted in pillow blocks 74, 76 secured to the airframe. The crankshaft 72 has two throws 80, 82 which are offset from each other by 180° with respect to the axis of the crankshaft. For example, the connecting rod 70 is connected between crank arm throw 80 and knee joint arm 60 (FIGS. 2-4) to translate the rotary engine and crankshaft motion E into a reciprocal linear motion F, G. Therefore, the connecting rod 70 is moving up (as viewed in FIG. 1A) while the connecting rod 81 is moving down. This means that the wing 32 on spar 40 is flapping upwardly, while the wing 36 on spar 44 is flapping downwardly. Likewise, the connector rod 83 is moving down in FIG. 1A, while spar 42, and wing 34 are flapping downwardly. Connector rod 84 is moving up in FIG. 1A, while spar 46, and wing 38 are flapping upwardly. As the crankshaft 72 continues to rotate, the connector rods 70, 81, 83, 84 continue to flap the wings up and down with this cyclical motion.

The crankshaft 72 is turned by gear or sprocket wheel 78, which may be tied in with the gears or drive trains 92-98 which are turning the pitch control drive train. Therefore, as the wings are flapping up and down, they are also being rotated simultaneously and synchronously about their longitudinal axis.

The hollow tubular arm 60 (FIG. 3) of the knee joint fitting 56 is fitted with a sliding bearing block 50 which is positioned therein to move over an excursion fixed by the length of a slot 88 formed in the tubular arm wall. An aircraft type control cable 90 is connected to position the sliding bearing block 50 within the tubular arm 60. Thus, if cable 90 is pulled, sliding bearing block 50 moves toward the trunnions 64 which form the hinge pin, to shorten the lever arm between the hinge pin 64 and the connector rod 70. If the cable 90 is lengthened, the sliding bearing block 50 moves in an opposite direction to lengthen this same lever arm. Therefore, the flapping angle is increased or decreased by pulling or releasing control cable 90.

The rotation of the wing is controlled through gearboxes 92, 94, 96, 98 (FIG. 1) to crank arms 100-106 at opposing ends of the fuselage 20. The crank arms are connected to the wing spars via connector rods 108-114. Therefore, as the power of the engine turns the crank arms 100-106, the connector rods 108-114 move in a linear and reciprocating motion to cause the wing pitch to change synchronously with the flapping.

More particularly, an inspection of FIG. 1 indicates that, on one side of the aircraft, the longitudinally opposed cranks 100, 102 (for example), and therefore, connector rods 108, 110 move in opposite directions, while the transversely opposing pairs of cranks 104, 106 and connector rods 112 and 114 also move in opposing linear motions. Cranks 100, 106 and connector rods 108, 114 move in one direction, while cranks 104, 102 and rods 112, 110 move in the opposite direction. Each of these connector rods is coupled to move an individually associated arm 116 (FIG. 3) affixed to a spar and, therefore, to rotate the spar and its associated wing in bearings 66, 68.

By an inspection of FIG. 3, it is apparent that as the connector rod 70 and knee joint arm 56 is moved back and forth in directions F and G, the wing will flap up and down in directions H and I, with pivoting occurring about the hinge pins or trunnions 64, 64. At the same time, the cranks 100-106 are rotating and reciprocating the arm 116, spar 40, and the wing in directions J, K, while they are flapping up and down.

FIG. 5 is front view which schematically shows this mode of wing motion. Compare FIGS. 1 and 5 and note the positions of tip 118 at the nose of the aircraft. As shown in FIG. 5, wings 34 and 36 are moving upwardly, while wings 32 and 38 are moving downwardly. At the end of the stroke shown in FIG. 5, the directions of the strokes reverse. Thereafter, wings 36 and 34 will move downwardly, while wings 32 and 38 will move upwardly. Spars 40, 42, 44, 46 and their associated wings and rotate about their longitudinal axes during each stroke of the wing.

Figure 6:
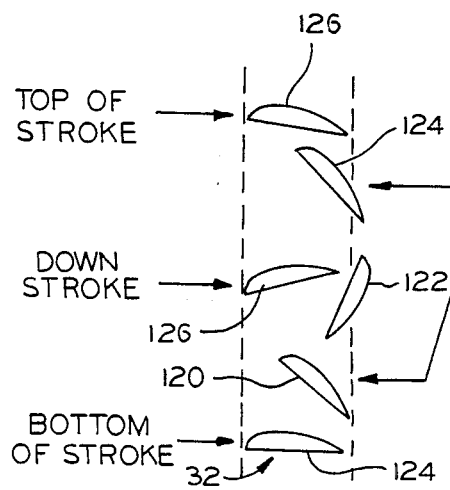
FIG. 6 is an end view of a wing tip airfoil or cross section, shown in many successive positions, to illustrate how the pitching of the wing varies during a beating cycle while the ornithopter is hovering.

FIGS. 6-8 show the paths followed by the airfoil or cross section of the wing 32 as it cyclically rotates during different modes of flight. While only wing 32 is shown, it should be understood that all wings will follow a similar cycle of rotation. In all positions, there is a minimum of air resistance. During the downstroke, there is both a lifting and a forward thrust to give the aircraft both forward speed and lift. At both the top and the bottom of the wing beating stroke, the wing is substantially horizontal to give pure lift.

If the aircraft is flying in a hovering mode, the tip end, cross section or airfoil view of wing 32, for example, follows the path seen in FIG. 6. At the start of an upstroke, the airfoil or cross section of wing 32 begins to rotate to a vertical position, as shown at 120. By the mid-stroke, the airfoil or cross section of wing 32 is substantially vertical, as shown at 122, to give a minimum wind resistance to the upwardly moving wing of a hovering wing. At the top of the stroke, the airfoil or cross section of wing 32 begins to move to a horizontal position, as shown at 124. On the downstroke, the airfoil or cross section of wing 32 is horizontal at the top 126 and bottom 124 of a stroke. As seen at 126, midway through the downstroke, the leading edge of the airfoil is lower than the trailing edge so that the wing is slightly biting into the air to give enough lift and forward thrust to overcome the sinking under gravity.

For a slow forward flight, the airfoil or cross section of wing 32 follows the path seen in FIG. 7. At the start of the upstroke, the wing begins to point upwardly 128. By the mid-upstroke 130, the wing is practically vertical. Near the top of the upstroke 132, the wing begins to level. On the downstroke at 134, the wing flattens out and begins to bite into the air to lift the aircraft and, eventually, to reach the sink rate angle of a glider wing flying at the slow speed. At the top of the upstroke wing position 132, 134, and at the bottom positions 128, 138, the airfoil is substantially horizontal to give a downward thrust upon the air which tends to lift the aircraft. By the mid-downstroke position 136, the wing is practically vertical to match the diving angle that a glider wing would take if flying at the same slow speed. For both hovering and low speed flight, the pitch change of the wing may be in the order of 110° to 120°.

For high speed flight (FIG. 8), the cycle of airfoil rotation is substantially the same as it is for slow flight (FIG. 7). However, the angle of the wing rotation is much less and the airfoil is more horizontal since the sink rate position of a glider wing at high air speed has a shallow attack angle. Thus, on the upbeat, the wing airfoil or cross section at 140 is climbing at an attack angle which is approximately the same as the attack angle of a glider that is climbing from position 144 to position 146 within a comparable horizontal distance and at the same forward speed. In the downsweep at position 142, for example, the wing is set at the sink rate of a glider wing for the forward speed. For high speed forward flight, the pitch change of the wing may be in the order of about 40° to approximately 60°, depending upon desired speed.

Theoretically, it is possible to calculate that an aircraft with a 1,200 pound empty weight, a thirty foot wing span and 250 horsepower span would handle a 600 pound payload. Such an aircraft will have to flap at about three and one-half flaps per second at a cruising speed. A little faster flapping is required for take-off. A radio controlled model could have a five foot wing span and could weigh ten pounds, for example. This model will have to flap at about four flaps per second. The flapping angle control is connected to the aileron servo in a model aircraft remote control unit and to the aileron control cable or other mechanism in a man carrying machine.

The flap and pitch angles may be individually controlled at each wing to give the aircraft greater flexibility in making unusual maneuvers which are not available in other forms of aircraft. More particularly, the pitch of the wing is controlled by crank arms 100-106 which are geared to turn in synchronism with the flapping crank arms 70, 81, 83, 84. By flapping, say, the left side wings through a slightly greater angle than the right side wings, a right roll can be obtained. Just as the individual wings on one side may flap over a different angle or be set at a different pitch as compared to the angle or pitch on the other side in order to bank, so may the front and back wings be set at different angles or pitches to provide a climb or dive control.

Now, it can be seen that not only does the wing pitch have to cycle synchronously with the flapping, but in order to have control, we also need means for:

1. Varying the pitch change from about 30° to about 110°.
2. Shift the position of the pitch change.
3. Control each wing independent of the other wings.

To summarize the mechanics of the controls:

A. To vary the wing flapping angle—lengthen or shorten the effective length of arm 60 by shifting block 50;
B. To vary the pitch angle change—lengthen or shorten the effective length of arm 116 in a manner similar to A above; and
C. To shift the limits of the pitch change cycle—move the gearboxes 92, 94, 96, and 98 closer or further from the main wing hinge.

Since there is no propeller and since the engine or engines would reasonably be better positioned for balance and for streamlining, the inventive aircraft is better equipped than the conventional helicopter or aircraft for gliding under a locked wing, power-out situation. Since locking the flapping and pitch cycling does not effect the pitch trim system, we have full rudder-elevator and aileron control available to effect an emergency landing. Also, the controls may be rigged to vary the wing pitch slightly under power outage conditions.

On a radio controlled model ornithopter, the main flapping arm length, the wing pitch actuating arm length, and the gearbox position may all be controlled by means of a commercial servo unit already in use on model aircraft. Except for the gearboxes, these controls are all connected by means of various types of known flexible cables.

The advantages of the invention should now be apparent. The inventive design uses a rigid, but hinged and pivoted wing. The prior art ornithopters use some form of a flexible wing. The invention achieves a structurally sound mechanism that can be built with the necessary flight control.

Those who are skilled in the art will readily perceive how to modify the invention. Therefore, the appended claims are to be construed to cover all equivalent structures which fall within the true scope and spirit of the invention.

The invention claimed is:

1. An ornithopter aircraft having a fuselage and four rigid tandem mounted wings disposed in forward and rear pairs on opposite sides of the fuselage, whereby said wings have a dragonfly configuration, means for beating said four wings in synchronism with a front wing on one side moving in synchronism with a rear wing on the opposite side, the front and back wings on each one side moving in opposition, the two front wings in opposition, and the two back wings moving in opposition, whereby a first of the forward wings in one tandem pairs on one side of the fuselage beats upwardly simultaneously with a rear wing in the opposing tandem pair on the opposite side of the fuselage, while the remaining two wings are beating downwardly, and means for cyclically varying the pitch of the wings throughout each beat to produce lift on the downstroke and minimum air resistance on the upstroke, the angular pitch of the wings during each of their downstrokes being set to equal the angular pitch corresponding to the angular pitch of a glider wing at the sink rate for the same flying speed.

2. The ornithopter of claim 1 and means for producing a differential between the pitches of the wings on opposite sides of the fuselage for controlling the direction and banking of the ornithopter.

3. The ornithopter of claim 1 wherein each of said wings is mounted on an individually associated horizontal hinge whereby said wing may beat up and down with substantially no fore and aft or swing motions.

4. The ornithopter of claim 3 and at least one first powered crank individually associated with said front wings and at least one second powered crank individually associated with said rear wings, each crank having opposing throws which move 180° out of phase with each other and which are connected to opposing wings on opposite sides of the aircraft, whereby one wing in each pair is going up while the other wing in said pair is going down and vice versa, the crank associated with a said front wing on one side being 180° out of phase with the crank associated with a rear wing on said one side, whereby the front wing on a side is going up while the back wing on that same side is going down.

5. The ornithoptfer of claim 1 wherein each of said wings is mounted on a main wing spar rotatably connected to said hinge, and means coupled to each of said spars for rotating said wings around a longitudinal axis thereof for changing the pitch of said wing as a function of the position of the wing in the up and down beating of said wing, whereby the pitch angle of a cross section of said wing cyclically takes different instantaneous bites throughout a beat cycle of each wing.

6. The ornithopter of claim 5 wherein the pitch angle of said wings places the cross section of the wing in a substantially vertical position during at least some of each upward stroke and places said cross section in substantially a horizontal position during at least some of each downward stroke whereby a hover flight is achieved.

7. The ornithopter of claim 5 wherein the pitch angle of said wings approximates a vertical position during at least some of both the upstroke and the downstroke in order to produce slow forward flight.

8. The ornithopter of claim 5 wherein the pitch angle of said wings cyclically follows a sinusodial path between the low point on a downstroke and a high point on an upstroke in order to produce a fast forward flight.

9. The ornithopter of claim 7 wherein said wing has a unitary main spar extending along a longitudinal axis of said wing, and said hinge is a fitting having an intersecting pair of arms laying in a given plane with pivot means extending substantially perpendicularly therefrom at the point of the intersection of said arms, one of said intersecting arms rotatably receiving a co-axial main spar of said wing, and the other of said arms being connected to a power driven reciprocating connector rod.

10. The ornithopter of claim 9 and pitch control means coupled to rotate said main spar through a cyclic motion synchronized with the beating of said wing.

11. The ornithopter of claim 10 and means for operating said pitch control means in a differential manner on opposite sides of the aircraft.

12. The ornithopter of claim 10 and means for beating said wings at flap angles which are different on opposite ends of the aircraft whereby said aircraft climbs and drives.

13. The ornithopter of claim 10 and means for operating said pitch control means to selectively rotate said main wing over a range of substantially 30°–110°.

14. The ornithopter of claim 10 and means for individually operating said pitch control means in different manners at each of the four wings.

15. The ornithopter of claim 1 wherein said means for varying the pitch of the wings includes a driven crankarm for cyclically rotating said wing, and means for longitudinally moving said crankarm toward or away from said wing in order to vary the mode of wing movements.

16. An ornithopter comprising a fuselage having a tandem pair of wings on each side in a dragonfly configuration, said wings being associated with each other in two opposing pairs wherein the front wing on one side moves simultaneously with and in the same direction as the rear wing on the opposite side, hinge means individually associated with each of said wings for mounting said associated wing on said fuselage, each of said hinge means including hinge pin means pivotally attached to said fuselage for enabling said associated wing to pivot up and down in a flapping motion, each of said hinge means further including bearing means for enabling said associated wing to rotate about a longitudinal axis, means for driving said wings to simultaneously flap and rotate in a synchronous cycle, and actuating means for individually and simultaneously flapping and rotating said wings in a cyclically phased sequence which enables said wings to raise with a minimum of air resistance and to lower at a glide angle appropriate for the forward speed of the ornithopter.

17. The ornithopter of claim 16 wherein said actuator menas comprises a crankshaft extending longitudinally within said fuselage, a throw on each end of said crankshaft centered between said opposing pairs of wings, said throws being offset 180° from each other, and connector rods extending from individually associated ones of said throws to individually associated ones of said hinge means for flapping wings, whereby each throw controls one of said opposing pairs of wings.

18. The ornithopter of claim 17 and a crankarm individually associated with each of said bearing means for individually rotating a wing at each bearing, said crankarms and said crankshaft being geared together to produce synchronized complex flapping and rotating mechanical motions.

* * * * *